(12) United States Patent
Greulich-Weber et al.

(10) Patent No.: US 8,168,116 B2
(45) Date of Patent: May 1, 2012

(54) METHOD FOR PRODUCING AN OBJECT AT LEAST PARTLY WITH A SILICON CARBIDE STRUCTURE FROM A BLANK OF A CARBON-CONTAINING MATERIAL

(75) Inventors: Siegmund Greulich-Weber, Bad Lippspringe (DE); Bettina Friedel, Paderborn (DE)

(73) Assignee: Universitaet Paderborn, Paderborn (DE)

( * ) Notice: Subject to any disclaimer, the term of this patent is extended or adjusted under 35 U.S.C. 154(b) by 0 days.

(21) Appl. No.: 12/312,741

(22) PCT Filed: Nov. 22, 2007

(86) PCT No.: PCT/DE2007/002119
§ 371 (c)(1),
(2), (4) Date: Jun. 4, 2009

(87) PCT Pub. No.: WO2008/061521
PCT Pub. Date: May 29, 2008

(65) Prior Publication Data
US 2010/0065991 A1    Mar. 18, 2010

(30) Foreign Application Priority Data
Nov. 23, 2006 (DE) .......................... 10 2006 055 469

(51) Int. Cl.
*B28B 3/00* (2006.01)
(52) U.S. Cl. ........................................ 264/673; 264/682
(58) Field of Classification Search .................. 264/673, 264/682
See application file for complete search history.

(56) References Cited

U.S. PATENT DOCUMENTS

| | | | |
|---|---|---|---|
| 4,513,030 A | | 4/1985 | Milewski |
| 4,517,305 A | * | 5/1985 | Suzuki et al. .................... 501/89 |
| 5,340,417 A | * | 8/1994 | Weimer et al. ................. 148/513 |
| 6,221,154 B1 | * | 4/2001 | Lee et al. ........................ 117/87 |
| 2002/0110517 A1 | * | 8/2002 | James et al. ................... 423/593 |
| 2003/0034113 A1 | * | 2/2003 | Butler et al. ................ 156/89.11 |
| 2006/0070403 A1 | * | 4/2006 | Tessier et al. ................... 65/17.2 |
| 2006/0087063 A1 | * | 4/2006 | Bandyopadhyay et al. .. 264/655 |
| 2006/0121266 A1 | * | 6/2006 | Fandel et al. ............... 428/312.6 |
| 2006/0283095 A1 | * | 12/2006 | Mahulikar et al. .............. 51/308 |
| 2007/0166218 A1 | * | 7/2007 | Hirosaki et al. .............. 423/325 |

FOREIGN PATENT DOCUMENTS

| | | |
|---|---|---|
| DE | 21 23 572 | 11/1972 |
| DE | 33 22 060 | 12/1983 |
| WO | WO 82/01545 | 5/1982 |

OTHER PUBLICATIONS

Martin, H. P. et al, "Silicon carbide derived from silicon sol and sugar." Journal of Materials Science Letters 14 (1995) 620-622.*
International Search Report.
Moss, G. P. et al., "Glossary of Class Names of Organic Compounds and Reactive Intermediates based on Structure," *Pure & Appl. Chem*, vol. 67, Nos. 8/9, 1995, IUPAC Compendium of Chemical Terminology, 2nd Edition, pp. 1307-1375. (Spec, p. 12).

* cited by examiner

*Primary Examiner* — Matthew Daniels
*Assistant Examiner* — Russell Kemmerle, III
(74) *Attorney, Agent, or Firm* — Collard & Roe, P.C.

(57) ABSTRACT

The invention relates to a method for production of an object with an at least partly silicon carbide structure from a blank of a carbon-containing material, wherein, in a first step, the object made from the carbon-containing material is produced essentially in the desired end form and/or end size, the object made from the carbon-containing material is then at least partly enveloped in a carbon-rich silicon dioxide granulate and then fired at least once in the envelope in a protective gas atmosphere such that the silicon dioxide granulate gives off gas containing silicon carbide which diffuses into the object and the carbon-containing material is completely or partly converted into silicon carbide. The invention further relates to a method for producing an object with an at least partly silicon carbide structure from a blank made from a carbon-containing material or a porous silicon carbide in which the pre-made object is infiltrated with a precursor sol containing silicon and carbon and fired at least once in a protective gas atmosphere at a firing temperature for carrying out a carbothermal reduction, wherein the infiltrated precursor sol gives off a gas containing silicon carbide which converts the material of the object partly or completely into silicon carbide.

30 Claims, No Drawings

METHOD FOR PRODUCING AN OBJECT AT LEAST PARTLY WITH A SILICON CARBIDE STRUCTURE FROM A BLANK OF A CARBON-CONTAINING MATERIAL

CROSS REFERENCE TO RELATED APPLICATIONS

This application is the National Stage of PCT/DE2007/002119 filed on Nov. 22, 2007, which claims priority under 35 U.S.C. §119 of German Application No. 10 2006 055 469.8 filed on Nov. 23, 2006. The international application under PCT article 21(2) was not published in English.

The invention relates to methods for the production of an object having an at least partly silicon carbide structure, from a blank composed of a carbon-containing material.

The production of objects, such as components or also wear parts, entirely or partly from silicon carbide, is extremely complicated at present, because silicon carbide is a high-strength material that is very difficult to shape or machine. Silicon carbide is a non-toxic high-temperature ceramic, which is of great interest particularly because of its excellent properties, such as diamond-like hardness, optical transparency, semiconductor character, great thermal conductivity, chemical and thermal resistance, among others, and is therefore used in many different areas of technology, such as the production of refractory materials, insulators, and as a semiconductor material, for example. For this reason, the production of objects from silicon carbide has great economic significance.

Usually, objects composed of silicon carbide are produced using conventional sintering methods, in which a solid, ground silicon carbide powder is baked together at high temperatures, using different binders. Disadvantages of this method of procedure are not only the required high temperatures and the long sintering times, but also the porosity of the objects formed, which permits use only for specific applications.

A different production method for objects composed of silicon carbide is known from DE 33 22 060 A1, in which method an object is produced from a carbon-containing material, such as graphite, in a manner true to dimensions and shape, and subsequently, the carbon of the object is replaced, at least close to the surface, by silicon carbide, during a long-lasting annealing treatment, by means of diffusion processes. For this purpose, the object is packed into a granulate of silicon dioxide during annealing, and hydrogen gas, for example, is passed over the granulate during annealing. In this way, a gas having a noteworthy proportion of silicon monoxide is supposed to be produced, which then can diffuse into the carbon-containing material of the object, close to the surface, and reacts with the carbon of the object in such a manner that silicon carbide forms in the matrix of the object. In this way, replacement of the carbon of the object with silicon carbide can be achieved, at least close to the surface, thereby making it possible to achieve a corresponding improvement of the regions of the object close to the surface. Disadvantages of this method are that the production of the silicon monoxide gas is complicated, and that the necessary amount proportions of the silicon monoxide in this gas can be adhered to and metered only with difficulty.

It is therefore the task of the present invention to indicate improved production methods for objects composed of silicon carbide, in which an object composed of carbon-containing material or a porous silicon carbide can be converted to silicon carbide, in whole or in part, in simple and reliable manner.

The solution for the task according to the invention results from the characterizing features of claim 1, and of claim 32, respectively, in interaction with the characteristics of the preamble, in each instance. Other advantageous embodiments of the invention are evident from the dependent claims.

The invention according to claim 1 proceeds from a method for the production of an object having an at least partly silicon carbide structure, from a blank composed of a carbon-containing material. In this connection, in a manner according to the invention, in a first step, the object is produced from the carbon-containing material, essentially in accordance with its desired final shape and/or final dimensions, the object composed of the carbon-containing material is sheathed, at least in certain regions, with a carbon-rich silicon dioxide granulate, and annealed at least once in this sheathing, in an inert gas atmosphere, at an annealing temperature, whereby the silicon dioxide granulate gives off gas that contains silicon carbide, which penetrates into the object and converts the carbon-containing material into silicon carbide, in part or in its entirety. The significant advantage of this lies in the fact that pure silicon carbide gas or gas that contains silicon carbide, having a high proportion of silicon carbide, is directly formed from the carbon-rich silicon dioxide granulate, and this gas can diffuse directly into the carbon-containing material of the object, and replace the carbon there, in whole or in part. As a result, the originally soft carbon matrix of the object is converted, in whole or in part, into a hard silicon carbide matrix, and the object thereby receives the advantageous properties of the silicon carbide, partially or in its entirety. Since no significant changes in shape of dimensions of the object accompany this conversion of the matrix, the object can be used directly, without any additional machining, after the conversion. The object produced corresponds to the original graphite model, and consists partly or even completely of hard polycrystalline porous silicon carbide. The method adheres to dimensions and is highly scaleable on an industrial scale. This is therefore a cost-advantageous method for producing parts of any desired shape from silicon carbide. For production of a specific silicon carbide body, the object is first produced from the carbon-containing material, such as graphite, for example, as a model of the desired shape. The carbon modification graphite is very easy to work, because of its very low hardness, and for this reason, no great effort is required (the method is also suitable for other carbon-containing materials, such as glass carbon, but this is harder than graphite). A special carbon-rich $SiO_2$ granulate is needed for the conversion of a graphite model to silicon carbide. The molded graphite part to be converted is heated, together with this granulate, for several hours, causing the carbon in the object to be slowly converted to silicon carbide. Such an inexpensive and simple method of production (relatively low production temperature, low costs for the starting materials, no high pressure required, no complicated machining of the object after the formation of silicon carbide, etc.) is of great interest for diverse areas of application, from the semiconductor industry by way of medical applications to turbine construction. Special applications would be, for example, the construction of cooling bodies for high-power LEDs (utilization of the good thermal conductivity of the silicon carbide), catalysts and filters (porosity, dopability, chemical, thermal, and mechanical resistance), bone and/or joint prostheses (utilization of the great hardness and good compatibility with human tissue), as well as fireproof high-temperature casting molds.

It is of particularly significance that the carbon is present in the carbon-rich silicon dioxide granulate in such finely distributed manner that when the granulate is heated, the silicon dioxide reacts directly with this carbon and, in doing so, forms a gas that contains silicon carbide, preferably pure silicon carbide, to a great extent. By means of the distribution of the carbon in the silicon dioxide, the result can be achieved that the formation of the gas that contains silicon carbide takes place at a temperature far below the normal sublimation temperature of the silicon carbide, particularly already at temperatures between 1700° C. and 1900° C., and that therefore, silicon carbide gas is made available directly, in the manner described, for diffusion into the object. In a further embodiment, it is advantageous, in this connection, if the gas that contains silicon carbide penetrates into the object composed of the carbon-containing material, in gaseous form, and displaces the carbon of the object out of the carbon matrix. In this way, the main component of the matrix is converted from carbon to silicon carbide, while extensively maintaining the structure of the matrix, and the properties of the object are changed and improved in the manner already described. In this connection, in a further embodiment, the gas that contains silicon carbide can react directly with the structure of the carbon-containing material, and can embed itself into the matrix of the carbon-containing material, in place of the carbon in the carbon-containing material, as silicon carbide, preferably in the modification 3C of silicon carbide. The desired modification of the silicon carbide can be changed as a function of the later purpose of use of the object.

It is furthermore advantageous that the annealing temperature of the object in the sheathing composed of silicon dioxide granulate can amount to only between 1700° C. and 2300° C., preferably 1800° C., in order to trigger the formation of the gas that contains silicon carbide, as described, and to allow the corresponding diffusion processes to occur. In this way, no annealing temperatures far above 2000° C., such as typically 2700° C. and higher, are required; for one thing, this makes the process significantly easier to control, and for another, far less energy is consumed.

In another embodiment, it is possible that the object is subsequently treated, after annealing and removal of the silicon dioxide granulate, at a subsequent treatment temperature, under ambient atmosphere, in order to remove residual carbon components, whereby the subsequent treatment temperature of the object lies above the carbonization temperature of at least 350° C., and preferably must amount to 1000° C. In this way, any carbon residues remaining in the matrix of the object after annealing can be removed; these could impair the mechanical or electrical properties of the object, for example. Also, at the stated temperatures, and because of the subsequent treatment under normal atmosphere, this subsequent treatment can be carried out in simple manner.

Furthermore, it is possible that the annealing process in the sheath composed of silicon dioxide granulate is repeated multiple times, particularly more than three times, with at least partial replacement and/or renewal of the silicon dioxide granulate, in each instance. By means of the formation of the gas that contains silicon carbide, and because of the consumption of the carbon in the granulate, replacement of the granulate and multiple annealing can be used to ensure that sufficient gas that contains silicon carbide is formed at all times, and thus the replacement of carbon in the object by silicon carbide can proceed in speedy manner. The object, together with this granulate, is heated in an argon atmosphere, for example, for a few hours, then fresh granulate is filled in and heating takes place again; this process is repeated multiple times, advantageously three times, depending on the size of the object. Subsequently, the molded part can be heated in air in order to burn off carbon residues. In this connection, it is possible that the duration of the annealing process and the frequency of replacement of the silicon dioxide granulate influences the penetration depth of the silicon carbide formation in the object. In this way, the degree of formation of silicon carbide can be controlled well, particularly if the carbon matrix of the object is replaced only close to the surface or partially, and adapted to the later uses of the object, in each instance.

It is particularly advantageous if the object composed of the carbon-containing material is produced from graphite, glass carbon, or the like, since in the case of such materials, the object composed of the carbon-containing material can be easily machined in order to produce the shape of the object in its final dimensions. However, in this connection it is certainly also possible to produce the object from other carbon-containing materials that are not explicitly mentioned here.

In a further embodiment, it is possible that the object, after treatment, has a structure composed of polycrystalline porous silicon carbide, at least in certain regions. In this way, any parts of the object that are subject to great stress can be coated in certain sections, only where the stress interacts with the object, and can bring about an improvement in the material properties of the object there. However, it is practical, particularly for objects subject to great mechanical stress, if the entire object has a structure of polycrystalline porous silicon carbide after the treatment, because then, the object as a whole can withstand great mechanical stress.

It is of significant advantage for carrying out the method if the carbon-rich silicon dioxide granulate is produced using a sol-gel process with subsequent carbothermal reduction. By means of the use of a sol-gel process for the production of the carbon-rich silicon dioxide granulate, the distribution of the carbon, or also of other substances to be added to the granulate, can be adjusted very precisely and very finely, almost on an atomic basis, thereby improving the formation of the gas that contains silicon carbide, or actually making it possible on a larger scale, at all. The fine distribution of the carbon and the other substances to be added to the granulate, which can be achieved by means of the sol-gel process, makes it possible for the gas that contains silicon oxide and forms during the annealing process to react directly with the carbon and the other substances to be added, and is therefore available for the diffusion processes, close to the surface of the object. In this way, in particular, external production of a gas that contains silicon oxide, which is otherwise necessary, can be eliminated.

It is advantageous if the sol-gel process uses a soluble, hydrolyzable inorganic or organic silicate as the starting product for production of the carbon-rich silicon dioxide granulate. This term comprises a great number of possible starting substances, which are available as a silicon supplier to form the granulate, and can advantageously be used in the sol-gel process. In this connection, the substances explicitly indicated below represent only preferred representatives of the substance classes mentioned above, and cannot be viewed as being an exhaustive list of substances to be used.

In the case of the inorganic silicates, in particular, water-soluble alkali silicates such as water glass or the like, or also water-soluble silicon hydride compounds such as silanes can be used as starting substances for the sol-gel process, whereby the synthesis would have to be adapted slightly, in each instance, i.e. the solvent, catalyst, temperature, and time might have to be adapted to one another (for example, if the organic silicate mentioned below, tetraisopropoxy silane, is used, one would use isopropanol as the solvent, because of the "molecule kinship").

According to the IUPAC nomenclature, silanes are silicon hydride compounds, whereby the term is often used incorrectly as a general term for other silicon compounds, in part also for alkoxides, so that confusion often occurs. The term "silane," for example in the English word for TEOS, "tetraethoxy silane," is only allowed to be used in the formula name in a word with the other appended organic or inorganic groups ("silanes: saturated silicon hydrides, analogues of the alkanes; i.e. compounds of the general formula $Si_nH_{2n+2}$. Silanes may be subdivided into silane, oligosilanes, and polysilanes. Note: hydrocarbyl derivatives and other derivatives are often referred to loosely as silanes." 1995, 67, 1365, IUPAC Compendium of Chemical Terminology $2^{nd}$ Edition (1997)).

In the case of the organic silicates, silicon acetates, silicon mercaptates, or silicon alkoxides, particularly preferably also tetraethyl orthosilicate (TEOS), can be used. The latter can be grouped in the substance group having the chemical short formula $Si(OR)_n$; the latter also includes TEOS. Synthesis of these silicon alkoxides is a separate branch of research, and for this reason, new silicon alkoxides are constantly being added, which can have any desired complex configuration. They mostly differ in their type and speed of reaction. All these silicon alkoxides are supposed to be included within the scope of this invention. Silicon alkoxides belong to the metal-organic compounds, and are, simply stated, a compound composed of a silicon atom ("Si"), to which at least one oxygen atom ("O") is bound, at first, onto which, in turn, an organic group is suspended ("R"). Currently, there are over 800 different silicon alkoxides, alone, that can be purchased on the market. The most advantageous and most often used, having the form $Si(OR)_4$, where R=alkyl group, are tetraethoxy silane (or also TEOS)
tetramethoxy silane (or also TMOS—tetramethyl orthosilicate)
tetraisopropoxy silane
tetra-n-butoxy silane.

It is furthermore advantageous if the organic or inorganic silicate is dissolved in a chemically suitable solvent, and at least one other substance is added as an additive, which substance mixes molecularly with the silicate, within the sol. The formation of the silicon carbide gas, in particular, can be advantageously influenced by means of the properties of the additive.

In another embodiment, it is possible that salts or other compounds are used as the additive, which have atoms of a chemical element that is to be introduced, particularly are added to the sol as an additive that contains nitrogen N, aluminum Al, boron B, phosphorus P, or erbium Er, or compounds that contain these substances, as atoms of a chemical element. Salts or other compounds of the atoms to be introduced are particularly suitable. The compounds must particularly fulfill a few requirements, in order to achieve homogeneous distribution in the granulate; they should contain only one possible doping atom,
should have good to moderate solubility in water or ethanol (exceptions: if the substance decomposes to something soluble in combination with one of the substances participating in the reaction),
are not allowed to be too reactive in connection with the other substances used for production, in order not to disrupt the sol-gel process (it must be possible for hydrolysis, condensation, and gelation to proceed undisturbed),
are not allowed to decompose or convert to something insoluble during the sol-gel process,
are not allowed to oxidize (too rapidly),
are not allowed to be volatile (in other words evaporate) below 1000° C.,
are not allowed to decompose into a compound or convert to a substance that only evaporates above 1800° C. during the sol-gel process or the heat treatment (in other words up to 1700° C., for example).

These requirements can be fulfilled by the following substances, among others, which are being mentioned in the form of a partial listing of other possible substances that can fulfill the aforementioned requirements:

| Doping | Compounds |
|---|---|
| Erbium (Er) | Erbium chloride |
| | Erbium in elemental form (see above → only dissolves in combination with HCl) |
| Nitrogen (N) | Ammonium chloride |
| | Potassium nitrate |
| | Nitric acid |
| | Melamine, urea |
| Phosphorus (P) | Potassium dihydrogen phosphate |
| | Disodium hydrogen phosphate |
| | Phosphoric acid (however, this is rather dangerous) |
| Aluminum (Al) | Aluminum chloride |
| | Aluminum in elemental form (see above → only dissolves in combination with HCl) |
| Boron (B) | Disodium tetraborate |

In general, compounds that meet the aforementioned requirements are sought, among others, in the groups of the acetates, acetyl acetonates, chlorides, nitrates, sulfates, phosphates (only for P), borates (only for B), amino compounds (only for N), or acids, but also soluble hydrolyzable compounds that carry the doping atom, in other words organic compounds, for example, such as alkoxides of the doping atom (e.g. boron ethoxide for boron, aluminum methoxide for aluminum), or inorganic compounds, such as aluminum silicate (kaolin).

Furthermore, it is advantageous that when nitric acid is used as the doping material for nitrogen N, incorporation of the silicon-containing gas into the matrix of the carbon-containing material of the object is improved. This is based on the fact that the nitric acid can start to dissolve the carbon of the object, at least on the surface, and therefore improved diffusion of the gas that contains silicon carbide into the interior of the object is brought about.

In a particularly preferred combination of the starting substances, it is possible, for the sol-gel process, that the silicon dioxide granulate is produced using tetraethyl orthosilicate, ethanol as the solvent, nitric acid as the catalyst, and saccharose as the doping material. In this connection, any similar highly carbon-rich organic substance soluble in ethanol or water can also be used in place of saccharose.

Furthermore, it is advantageous if the silicon dioxide granulate is subsequently treated by means of a carbothermal reduction after the gel formation, and afterwards powdered. In this way, a physically fine distribution of the granulate, with a large reaction surface for forming the silicon-containing gases, can also be achieved.

Furthermore, it is advantageous that the annealing process is carried out under an inert gas atmosphere, at normal pressure. In this way, the production of high pressures, which is otherwise frequently necessary, with the apparatus effort required for this, and the accompanying costs, is made unnecessary. Furthermore, all that is required is that the annealing process is carried out over several hours, and thus extensive or complete conversion of the carbon of the object to silicon carbide can already be achieved by means of relatively short treatment times.

An advantage can also be seen in the fact that the subsequent treatment under oxygen lasts between 5 and 15 hours, preferably 10 hours, and thus also requires relatively short subsequent treatment times and no need for special atmospheric conditions.

The invention according to a second aspect relates to a method for the production of an object having an at least partly silicon carbide structure, from a blank composed of a carbon-containing material or a porous silicon carbide. In this connection, in a first step, the object is produced essentially in accordance with its desired final shape and/or final dimensions, and subsequently, it is infiltrated with a precursor sol that contains silicon and carbon, and annealed at least once, in an inert gas atmosphere, at an annealing temperature, in order to carry out a carbothermal reduction, whereby either the infiltrated precursor sol gives off gas that contains silicon carbide, which converts the material of the object into silicon carbide, in part or in its entirety, or the material of the object is converted directly, by means of diffusion processes between precursor sol and material, for example. By means of the infiltration of the precursor sol, which is advantageously identical to the sol or similar to the sol that is used for production of the silicon dioxide granulate, as described above, the substance that gives off silicon carbide penetrates deep into the interior of the object, and can carry out the silicon carbide formation, and thus the conversion of the structure of the object, during subsequent annealing in an inert gas atmosphere at an annealing temperature, for carrying out carbothermal reduction, in more targeted and more effective manner than in the case of simply sheathing the object by means of the granulate described above. In this connection, usual vacuum and/or pressure infiltration methods, for example, can be used as infiltration methods.

In this connection, it must be emphasized that many of the characteristics, properties, and details described above in connection with the method according to the first aspect of the invention, also apply to the method by means of infiltration by the precursor sol, and can be used there. For example, the composition of the precursor sol, in particular, is identical or similar to that of the silicon dioxide granulate; the treatment sequences and conditions of the object during annealing, as well as the annealing temperatures, can also be used here. For example, the object can particularly be annealed at an annealing temperature, for carrying out a carbothermal reduction, of essentially 1800° C. The characteristics, properties, and details described in connection with the method according to the first aspect of the invention are not stated in detail again here only in order to avoid repetition, but they are nevertheless made the object of the invention according to the second aspect, to their full extent.

It is furthermore advantageous if the object is presintered at a temperature of essentially 1000° C. after infiltration of the precursor sol. In this connection, presintering ensures that the precursor sol is embedded into the structure of the object and stabilized, to such an extent that during other infiltration steps that preferably follow, the precursor sol that has already infiltrated remains within the structure and can be enriched with additional precursor sol. In this way, the penetration depth and the concentration of the precursor sol can be changed by means of multiple infiltration steps, with presintering preceding them, in each instance, and then the conversion to silicon carbide can be triggered with the final annealing at an annealing temperature for carrying out a carbothermal reduction. During the presintering itself, no processes of a carbothermal reduction take place, as yet. In this connection, infiltration with presintering can take place as often as desired, until the desired distribution of the precursor sol in the structure of the object has been reached. As a final step, the object is then subjected to carbothermal reduction, as has already been described.

However, it is also possible that the object is treated with gel and dried after the infiltration of the precursor sol. This treatment takes longer and is more complicated, but also leads to a structure of the object that is filled with a substance that gives off silicon carbide. Here, too, annealing at an annealing temperature takes place in order to carry out a carbothermal reduction.

Another improvement in influencing the infiltration of the object can be achieved in that the precursor sol is diluted before the infiltration, preferably with ethanol, and thus the viscosity of the precursor sol is reduced. In this way, the diluted precursor sol can penetrate deeper into the structure of the object, and the substance that gives off silicon carbide can embed itself in the interior of the object in more targeted manner. In this connection, the density and/or the pore size of the infiltrated material after annealing at an annealing temperature is particularly adjusted by way of the dilution of the precursor sol and the accompanying change in the silicon proportion that is infiltrated into the object. Since the precursor sol then also contains less precursor material per volume of liquid, less substance is also embedded into the pores of the infiltrated material, and this allows control of the final effective density/pore size of the infiltrated material (after the carbothermal reduction), by way of the dilution of the precursor sol.

It is furthermore possible that the object composed of the carbon-containing material is converted, at least in part, to a silicon carbide structure, by means of being embedded into a carbon-rich silicon dioxide granulate, and subsequently infiltrated with the precursor sol. In this connection, it is possible to convert a carbon object to silicon carbide, using the granulate method according to the first aspect of the invention, only to such an extent until the body has formed a sufficiently stable silicon carbide structure. From this, the remaining carbon could then be burned out (in an oxidizing atmosphere), and the structure could be gradually compacted by means of the infiltration method according to the second aspect of the invention.

The invention also relates to an object produced according to the method according to the first aspect of the invention or produced according to the method according to the second aspect of the invention. Such objects, produced using the method according to the invention, can fulfill very different purposes, some of which will be named here as examples:

cooling bodies from the millimeter to meter range,
components that are subject to very great mechanical and thermal stress (e.g. drill heads, aircraft turbines, brake disks, heat protection tiles in space travel, linings of high-temperature furnaces),
refractory high-temperature casting molds,
filter material for aggressive media (e.g. polluted waste water or for corrosive chemicals),
filtering in high-temperature environments (e.g. as fine dust filters and catalyst carriers),
cooling elements or heat exchangers (e.g. in nuclear power plants),
uses in medicine (artificial bone and joint prostheses—made-to-measure production),
semiconductor uses (photovoltaics, LEDs, sensors, as a carrier material, can be doped during production),
ceramic uses in special fields (medicine, semiconductor industry, aerospace).

What is claimed is:

1. Method for the production of an object having an at least partly silicon carbide structure, from a blank composed of a carbon-containing material,
wherein in a first step, the object is produced from the carbon-containing material, essentially in accordance with its desired final shape and/or final dimensions, and subsequently,
the object composed of the carbon-containing material is sheathed, at least in certain regions, with a carbonaceous silicon dioxide granulate, and annealed at least once in this sheathing, in an inert gas atmosphere, at an annealing temperature, whereby the silicon dioxide granulate gives off gas that contains silicon carbide, which penetrates into the object and converts the carbon-containing material into silicon carbide, in part or in its entirety.

2. Method according to claim 1, wherein the carbon is present in the carbonaceous silicon dioxide granulate in such finely distributed manner that when the granulate is heated, the silicon dioxide reacts with this carbon and forms a gas that contains silicon carbide to a great extent.

3. Method according to claim 2, wherein the formation of the gas that contains silicon carbide takes place by means of distribution in the silicon dioxide at a temperature between 1700° C. and 1900° C.

4. Method according to claim 1, wherein the gas that contains silicon carbide penetrates into the object composed of the carbon-containing material, in gaseous form, and displaces the carbon of the object.

5. Method according to claim 1, wherein the gas that contains silicon carbide reacts directly with the structure of the carbon-containing material, and embeds itself into the matrix of the carbon-containing material, in place of the carbon in the carbon-containing material, as silicon carbide.

6. Method according to claim 1, wherein the object is subsequently treated, after annealing and removal of the silicon dioxide granulate, at a subsequent treatment temperature, under ambient atmosphere, in order to remove residual carbon components.

7. Method according to claim 6, wherein the subsequent treatment temperature of the object under ambient atmosphere lies above the carbonization temperature of at least 350° C.

8. Method according to claim 6, wherein the subsequent treatment under oxygen of the ambient atmosphere lasts between 5 and 15 hours.

9. Method according to claim 1, wherein the annealing temperature of the object annealing in the sheathing composed of silicon dioxide granulate amounts to between 1700° C. and 2300° C.

10. Method according to claim 1, wherein the annealing process in the sheath composed of silicon dioxide granulate is repeated multiple times, particularly more than three times, with at least partial replacement and/or renewal of the silicon dioxide granulate, in each instance.

11. Method according to claim 1, wherein the object composed of the carbon-containing material is produced from graphite or glass carbon.

12. Method according to claim 1, wherein the object, after treatment, has a structure composed of polycrystalline porous silicon carbide, at least in certain regions.

13. Method according to claim 1, wherein the object, after treatment, has a structure completely composed of polycrystalline porous silicon carbide.

14. Method according to claim 1, wherein the carbonaceous silicon dioxide granulate is produced in a sol-gel process, with subsequent carbothermal reduction.

15. Method according to claim 14, wherein the sol-gel process uses a soluble hydrolyzable inorganic or organic silicate as the starting product for production of the carbonaceous silicon dioxide granulate.

16. Method according to claim 15, wherein water-soluble alkali silicates are used as inorganic silicates.

17. Method according to claim 15, wherein water-soluble silicon hydride compounds such as silanes are used as inorganic silicates.

18. Method according to claim 15, wherein silicon acetates, silicon mercaptates, or silicon alkoxides are used as organic silicates.

19. Method according to claim 18, wherein tetraethyl orthosilicate (TEOS) is used as a silicon alkoxide.

20. Method according to claim 15, wherein the organic or inorganic silicate is dissolved in a chemically suitable solvent, and at least one other substance is added as an additive, which substance mixes molecularly with the silicate, within the sol.

21. Method according to claim 14, wherein salts or other compounds are used as the additive, which have atoms of a chemical element that is to be introduced.

22. Method according to claim 21, wherein nitrogen N, aluminum Al, boron B, phosphorus P, or erbium Er, or compounds that contain these substances, are added to the sol as an additive, as atoms to be introduced.

23. Method according to claim 22, wherein when nitric acid is used as the doping material for nitrogen N, incorporation of the silicon-containing gas into the matrix of the carbon-containing material of the object is improved.

24. Method according to claim 14, wherein the silicon dioxide granulate is produced using tetraethyl orthosilicate, ethanol as the solvent, nitric acid as the catalyst, and saccharose as the doping material.

25. Method according to claim 14, wherein the silicon dioxide granulate is produced using tetraethyl orthosilicate, ethanol as the solvent, nitric acid as the catalyst, and a carbonaceous organic substance soluble in ethanol or water as the doping material.

26. Method according to claim 14, wherein the silicon dioxide granulate is subsequently treated by means of a carbothermal reduction after the gel formation, and afterwards powdered.

27. Method according to claim 1, wherein the annealing process is carried out under an inert gas atmosphere, at normal pressure.

28. Method according to claim 1, wherein the annealing process is carried out over several hours.

29. Method according to claim 1, wherein the argon or nitrogen is used as an inert gas during the annealing process.

30. Method according to claim 1, wherein the object composed of the carbon-containing material is converted, at least in part, to a silicon carbide structure, by means of being embedded into a carbonaceous silicon dioxide granulate, and subsequently infiltrated with the precursor sol.

* * * * *